Aug. 18, 1953  E. P. FELCH, JR., ET AL  2,649,568
MAGNETOMETER
Filed July 12, 1949
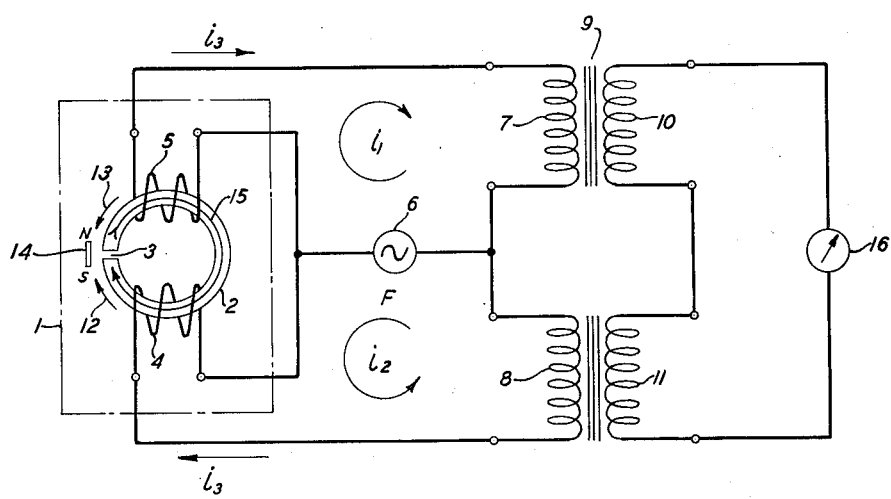
INVENTORS  E. P. FELCH, JR.
F. G. MERRILL
BY
ATTORNEY Patented Aug. 18, 1953

2,649,568

UNITED STATES PATENT OFFICE 2,649,568

MAGNETOMETER

Edwin P. Felch, Jr., and Francis G. Merrill, Chatham, N. J., assignors to Bell Telephone Laboratories, Incorporated, New York, N. Y., a corporation of New York Application July 12, 1949, Serial No. 104,361

9 Claims. (Cl. 324—34)

This invention relates to magnetometers or magnetic pick-ups of the saturated inductor type, useful for the detection of magnetic fields, and in particular to a device for detecting signals in a magnetic medium, or a magnetic gradient, within the sensing gap of the device.

One of the objects of the invention is a device that will detect recorded signals in magnetic tapes or other media without relative motion of the medium with respect to the sensing element of the device, and without demagnetizing the medium or otherwise disturbing the signals recorded thereon.

Saturated inductor magnetometers of the type disclosed in Patent No. 2,488,389, issued on November 15, 1949, used for detecting magnetic fields such as the earth's field, might be used to detect signals in a magnetic medium without relative motion except that, with the arrangement of cores, windings and circuits disclosed in the above-mentioned patent, the driving flux decreases the strength of the recorded signals or may otherwise obliterate the magnetic condition on the medium which gives rise to the signal. This invention covers a device which employs the principle of the saturated inductor in a novel manner to detect a magnetic gradient within the sensing gap of the device produced by signals in a medium without relative motion of the inductor and medium, or by other means, the essence of the device being an arrangement by which the driving flux in the inductor is reduced substantially to zero at and around the point of detection or sensing gap of the device.

These and other objects of the invention may be better understood from the following description taken in connection with accompanying drawing in which sensing element 1 comprises a suitably enclosed magnetic core 2 comprising either a single magnetic structure as shown or a plurality of other magnetic structures of different shapes, with a small gap 3 and a plurality of equal windings, such as windings 4 and 5, for example, symmetrically placed on the core with respect to gap 3. The generator 6 produces an electromotive force of frequency F which causes currents $i_1$ and $i_2$ to flow through windings 4 and 5, respectively, of the sensing element and thence to transformer 9 through windings 7 and 8 thereof. The windings of the transformer are so connected that the fluxes therein produced by the currents $i_1$ and $i_2$ are opposed and hence result in no electromotive force being generated across windings 10 and 11. The connections to the windings 4 and 5 of the sensing element 1 are so made that currents $i_1$ and $i_2$ produce equal fluxes 12 and 13 in core 2 which oppose and, since windings 4 and 5 are symmetrically placed with respect to gap 3, result in substantially zero flux in gap 3 and vicinity. Hence a signal represented by a small dipole 14, for example a magnetized spot in a tape, will not be demagnetized. The small leakage flux in the sensing gap 3 will have some, though inappreciable, effect upon a magnetized medium such as 14. This, however, may be reduced by interposing a shield of conducting nonmagnetic material between the medium and the sensing element. Currents $i_1$ and $i_2$ must be of a magnitude sufficient to saturate core 2. This, in absence of a signal at or in the vicinity of the gap 3, causes odd order harmonic electromotive forces to be generated equally across windings 7 and 8 of transformer 9 which, however, will result in no electromotive force across windings 10 and 11 due to the opposing connection of windings 7 and 8. Even order harmonic electromotive forces are not generated in the absence of a signal or other polarizing effect or strain in the core due to the symmetry of the B–H characteristic about the H axis, as is well understood.

A signal, represented by dipole 14 present in the proximity of the sensing gap 3, creates a flux 15 in core 2. This flux, entering the core through the gap, causes even order harmonic electromotive forces to be generated across windings 4 and 5. The phase of these electromotive forces is a function of the polarity of the signal flux 15 which, in winding 4, is in the same direction as in winding 5 and is opposite to the driving flux 12, as indicated. Hence, these even order harmonic electromotive forces add and cause a current $i_3$ to flow through winding 7 in the same direction as current $i_1$ and in winding 8 opposite to current $i_2$. Hence current $i_3$ will produce an electromotive force across windings 10 and 11 the magnitude of which is proportional to the magnetic field of the signal 14 and the phase of which is a function of its polarity, which may be shown on an appropriate indicator 16, or indicators. An amplifier of any suitable type may be interposed between the indicator 16 and the output windings 10 and 11 of transformer 9 to increase the strength of the received current and, further, suitable filters may also be interposed, if desired, between the windings 10 and 11 and the indicator 16 to remove unwanted harmonics.

It is obvious that the same result may be achieved by using one or more additional windings on core 2 in place of the transformer 9, connected as indicated, and it is also obvious that the circuit shown may be used in the reverse order by reversing winding 5 or 4 and exchanging generator 6 and indicator 16.

Although the system shown and described is particularly effective in detecting signals without relative motion of the detector and medium, it may also be used to detect signals when such motion exists. If, in the latter use, the rate of signal pole passage is below the frequency of the driving current F, the output voltage available to indicator 16 is independent of the speed of the signal.

We have illustrated our invention in connection with a specific form of a device especially adapted for use in detecting a magnetic gradient, signal or other magnetic disturbance in the proximity of the sensing gap of the device. Other modifications and adaptations of the invention will be apparent to those skilled in the art.

Moreover, the terms and expressions which we have used in reference to this invention are used as terms of description and not of limitation, and we have no intention in the use of such terms and expressions of excluding thereby equivalents of the features shown and described or portions thereof but, on the contrary, intend to include therein any and all equivalents and modifications which may be employed without departing from the spirit of the invention.

What is claimed is:

1. A magnetometer comprising in combination a core structure including a sensing gap, a single tapped winding surrounding said core, means for applying a driving frequency through said winding to saturate said core, said winding being so disposed around said core that the magnetomotive force appearing across said sensing gap and produced in said core structure by said driving frequency through one portion of said winding is of equal magnitude and opposite phase to that produced by said frequency through the other portion, and output means coupled to said winding responsive to currents induced therein by a magnetic field present in or around said sensing gap.

2. A magnetometer comprising in combination a core structure including a sensing gap, a plurality of windings surrounding said core, means for applying a driving frequency through said plurality of windings to saturate said core, said plurality of windings being so disposed around said core that the magnetomotive force appearing across said sensing gap and produced in said core structure by said driving frequency through some of said plurality of windings is of equal magnitude and opposite phase to that produced by said frequency through the other of said plurality of windings, and output means coupled to said plurality of windings responsive to currents induced therein by a magnetic field present in or around said sensing gap.

3. A device for detecting a magnetic gradient comprising an inductor having two poles and a sensing gap therebetween, means for saturating said inductor in magnetic opposition in the sensing gap thereof by a current of definite frequency, and means for detecting harmonics of said frequency produced by a magnetic gradient in said sensing gap between the poles of said inductor.

4. A device for detecting a magnetic gradient comprising an inductor having two poles and a sensing gap therebetween, means for saturating said inductor in magnetic opposition in the sensing gap thereof by a current of definite frequency, and means for detecting even harmonics of said frequency produced by a magnetic gradient in said sensing gap between the poles of said inductor.

5. A device for detecting a magnetic gradient comprising an inductor having two poles and a sensing gap therebetween, means for saturating said inductor in magnetic opposition in the sensing gap thereof by a current of definite frequency, and means for detecting the second harmonic of said frequency produced by a magnetic gradient in said sensing gap between the poles of said inductor.

6. In combination with a medium having a magnetized portion, a magnetic reproducer comprising an inductor having two poles and a sensing gap therebetween, means for saturating said inductor in magnetic opposition in the sensing gap thereof by a current of definite frequency, and means for detecting an even harmonic of said frequency produced by said magnetized portion in said sensing gap when said magnetic portion is in proximity of the two poles of said inductor.

7. In combination with a medium having a magnetized portion, a device for detecting said magnetized portion which comprises a magnet having two poles and a sensing gap therebetween, two inductively balanced windings thereon, means for supplying said two windings with an alternating current of definite frequency thereby to saturate said magnet in magnetic opposition in said sensing gap, and means for detecting harmonics of said frequency produced in said windings by said magnetized portion when the latter is in the proximity of the two poles of said magnet.

8. In combination with a medium having a magnetized portion, a device for detecting said magnetized portion which comprises a core of magnetic material having two poles and a sensing gap therebetween, two inductively balanced windings thereon, means for supplying said two windings with an alternating current of definite frequency, thereby to magnetize said core to saturation in opposite directions, and means for detecting an even harmonic of said frequency produced in said windings by said magnetized portion when the latter is in the proximity of the two poles of said core.

9. In combination with a medium having a magnetized portion, a device for detecting said magnetized portion which comprises a core of magnetic material having two poles and a sensing gap therebetween, said core having two inductively balanced windings thereon, a transformer having two primary windings connected in series and two secondary windings connected in series, a source of alternating current of definite frequency connected between the common terminal of the primary windings of said transformer and two terminals of said two windings on said core, said two other terminals of said windings on said core being respectively connected to the two other terminals of the primary windings of said transformer, the connection of said current source to the primary windings of said transformer and the windings on said core and the connection of the latter to the primary windings of said transformer being such that the current from said source flows in opposite directions through said primary windings and in opposite directions through the windings of said core, thereby to produce no electromotive force in the secondary winding of said transformer and equal but opposite saturating magnetic fluxes in said core, and means connected to the secondary windings of said transformer for detecting an even harmonic of the frequency of said source produced in the windings of said core by said magnetized portion when the latter is in said sensing gap within proximity of the two poles of said core.

EDWIN P. FELCH, Jr.
FRANCIS G. MERRILL.

References Cited in the file of this patent

UNITED STATES PATENTS

| Number | Name | Date |
|---|---|---|
| 1,417,710 | Ballman | May 30, 1922 |
| 2,252,059 | Barth | Aug. 12, 1941 |
| 2,258,837 | Buschlag | Oct. 14, 1941 |
| 2,390,051 | Barth | Dec. 4, 1945 |
| 2,406,870 | Vacquier | Sept. 3, 1946 |
| 2,410,039 | Beach | Oct. 29, 1946 |
| 2,417,622 | Walsh | Mar. 18, 1947 |
| 2,418,553 | Irwin | Apr. 8, 1947 |
| 2,475,421 | Camras | July 5, 1949 |
| 2,475,593 | Craddock et al. | July 12, 1949 |